(12) United States Patent
Caretti et al.

(10) Patent No.: US 8,320,320 B2
(45) Date of Patent: Nov. 27, 2012

(54) METHOD AND SYSTEM FOR DOWNLINK TRANSMISSION SCHEDULING IN MULTI-CARRIER NETWORKS

(75) Inventors: Marco Caretti, Turin (IT); Claudio Cicconetti, Pisa (IT); Ivano Salvatore Collotta, Turin (IT); Paolo Tongiani, Massa (IT); Luciano Lenzini, Pisa (IT); Enzo Mingozzi, Pisa (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/142,632

(22) PCT Filed: Dec. 31, 2008

(86) PCT No.: PCT/EP2008/068380
§ 371 (c)(1),
(2), (4) Date: Jun. 29, 2011

(87) PCT Pub. No.: WO2010/075901
PCT Pub. Date: Jul. 8, 2010

(65) Prior Publication Data
US 2011/0261778 A1    Oct. 27, 2011

(51) Int. Cl.
*H04W 4/00* (2009.01)
(52) U.S. Cl. .......... 370/329; 370/343; 370/431; 455/17; 455/45
(58) Field of Classification Search .......... 370/329–338, 370/341, 343–344, 347–348
See application file for complete search history.

(56) References Cited

U.S. PATENT DOCUMENTS
2005/0265223 A1   12/2005  Song
2006/0089102 A1 *  4/2006  Nishio et al. ............... 455/67.11
2006/0164972 A1 *  7/2006  van Rensburg et al. ...... 370/208
2007/0060178 A1    3/2007  Gorokhov et al.
(Continued)

FOREIGN PATENT DOCUMENTS
EP    1887723 A1 *  2/2008
GB    2447431    *  1/2007

OTHER PUBLICATIONS
V. Tralli et al., "Power-Shaped Advanced Resource Assignment (PSARA) for Fixed Broadband Wireless Access Systems," IEEE Transactions on Wireless Communications, vol. 3, No. 6, pp. 2207-2220 (Nov. 2004).
(Continued)

*Primary Examiner* — Ayaz Sheikh
*Assistant Examiner* — Mounir Moutaouakil
(74) *Attorney, Agent, or Firm* — Finnegan, Henderson, Farabow, Garrett & Dunner, L.L.P.

(57) ABSTRACT

A method of scheduling transmissions in a multi-carrier transmission system, includes, for each downlink transmission frame: partitioning the downlink transmission frame into a plurality of data regions each including an equal number of slots, each data region corresponding to a respective logical band; for a currently active connection: a) creating a first set of logical bands not fully occupied for transmission and having a minimum boosting level making the transmission receivable by a receiving terminal; b) extracting from the first set, a second set of logical bands available for allocating a maximum number of slots for downlink transmission to the active connection; and c) selecting the logical band for downlink transmission to the active connection from the second set as the logical band that, after allocating the slots to the considered connection, leaves a residual number of slots equal to or smaller than a predetermined minimum residual in the logical band, e.g., the smallest residual number of slots.

11 Claims, 5 Drawing Sheets

U.S. PATENT DOCUMENTS

| | | | |
|---|---|---|---|
| 2007/0165568 A1* | 7/2007 | Damnjanovic et al. | 370/329 |
| 2009/0104877 A1* | 4/2009 | Nishio et al. | 455/67.7 |
| 2009/0201826 A1* | 8/2009 | Gorokhov et al. | 370/252 |
| 2009/0201872 A1* | 8/2009 | Gorokhov et al. | 370/329 |
| 2010/0105390 A1* | 4/2010 | Ishii | 455/436 |
| 2010/0111204 A1* | 5/2010 | Kishiyama et al. | 375/260 |

OTHER PUBLICATIONS

Z. Diao et al., "An Adaptive Packet Scheduling Algorithm in OFDM Systems with Smart Antennas," 2005 IEEE 16th International Symposium on Personal, Indoor and Mobile Radio Communications, vol. 4, pp. 2151-2155 (Sep. 2005).

J. Ho, "QoS-, Queue-, and Channel-Aware Packet Scheduling for Multimedia Services in Multiuser SDMA/TDMA Wireless Systems," IEEE Transactions on Mobile Computing, vol. 7, No. 6, pp. 751-763 (Jun. 2008).

International Search Report from the European Patent Office in International Application No. PCT/EP2008/068380; Mailing Date: Nov. 9, 2009.

Written Opinion of the International Searching Authority from the European Patent Office in International Application No. PCT/EP2008/068380; Mailing Date: Nov. 9, 2009.

* cited by examiner

FIG. 6
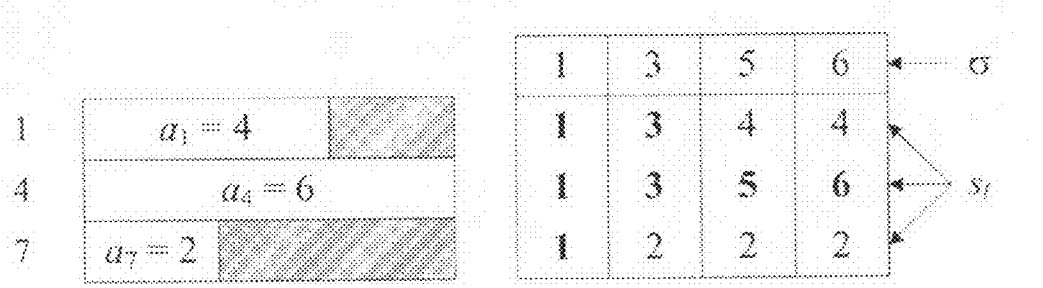
FIG. 7
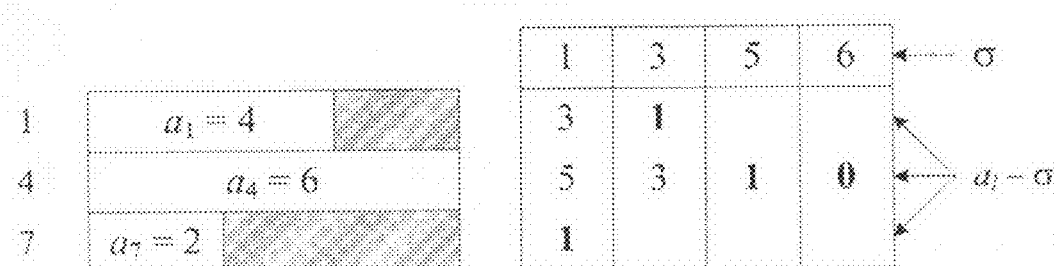
FIG. 8

METHOD AND SYSTEM FOR DOWNLINK TRANSMISSION SCHEDULING IN MULTI-CARRIER NETWORKS

CROSS-REFERENCE TO RELATED APPLICATIONS

This application is a national phase application of International Application No. PCT/EP2008/068380, filed Dec. 31, 2008, the contents of which are incorporated herein by reference.

BACKGROUND OF THE INVENTION

1. Field of the Invention

The present invention relates in general to the field of telecommunications, more particularly to multi-carrier networks like OFDMA (Orthogonal Frequency Division Multiple Access) wireless networks, and even more particularly to the management of radio resources in such networks. Specifically, the present invention concerns a method and system for scheduling downlink data transmission into the available resources. Typical application scenarios for the present invention includes, but are not limited to, beyond-3G cellular systems.

2. Description of the Related Art

Cellular phone systems and portable/movable terminals based on cellular transmission have evolved in the past years from $1^{st}$ generation systems, based on analogue narrowband Frequency-Division Multiple Access (FDMA) transmission, to systems based on digital narrowband Frequency and Time Division Multiple Access (FDMA/TDMA) transmission first (also referred to as the $2^{nd}$ generation or 2G systems), and, later, to digital broadband Code-Division Multiple Access (CDMA) transmission systems ($3^{rd}$ generation or 3G systems).

Further evolution, especially for supporting higher data rates, can be based on the improvement of the spectral efficiency of the transmission system. However, given the limits on spectral efficiency, an increase in the transmission bandwidth is foreseen for future generations of cellular phones. When transmission bandwidth is increased, the receiver typically shows an increase in circuit complexity, which is dependent on the type of modulation and multiplexing. 3G systems based on the CDMA operate effectively on bandwidths up to several MHz. 10 MHz are often considered a practical upper limit for the bandwidth of low-cost commercial CDMA equipment using a Rake receiver or other Single Carrier (SC) receivers with a time-domain equalizer.

When the bandwidth of the transmission systems becomes larger than a few MHz, a multi-carrier modulation is often more suitable to keep implementation complexity low.

The OFDMA transmission technique is gaining popularity as a preferred technology in the Broadband Wireless Access (BWA) emerging standards, particularly in respect of portable/mobile communications. The demand for high data rates, combined with physical requirements such as supporting near and non line of sight operation, multipath propagation mitigation and operation with fading channels, requires a technology that can efficiently provide an appropriate answer.

The OFDM (Orthogonal Frequency Division Multiplexing) technique can efficiently handle multipath propagation and increase robustness against frequency selective fading or narrow-band interference. OFDMA combines the TDMA and FDMA schemes; the time domain is segmented into groups of OFDMA symbols, and each symbol is segmented into sub-carriers. The number of symbols and sub-carriers which are allocated to a single transmitter vary according to the transmitter's needs (i.e. according to the amount of traffic data to be transmitted). The transmission rate (i.e. the adopted modulation and coding scheme) on those carriers is set to meet the transmitter's needs and capabilities.

Examples of OFDMA transmission systems are those compliant to the IEEE 802.16 family of standards, which relate to fixed and mobile BWA.

Even if flexible bandwidth allocation and QoS (Quality of Service) mechanisms are provided in the IEEE 802.16 standard, the details of scheduling algorithms, admission control, and reservation management are left to the implementation.

U.S. 2005/0265223 discloses a method and apparatus for scheduling downlink channels in an orthogonal frequency division multiple access system. Terminals compute a plurality of channel capacities and search for a channel with a maximum capacity. The terminals send, to a base station, feedback information including a channel number and a capacity value of the channel with the maximum capacity. The base station performs a first channel allocation process for allocating a channel with an optimal capacity to each terminal on the basis of the feedback information. The base station performs a second channel allocation process for allocating an adjacent channel to a corresponding terminal using the window bit when the terminal is not allocated a channel in the first channel allocation process.

U.S. 2007/060178 discloses systems and methods of scheduling sub-carriers in an OFDMA system in which a scheduler takes into account channel conditions experienced by the communication devices to optimize channel conditions. The scheduler can partition a set of sub-carriers spanning an operating bandwidth into a plurality of segments. The segments can include a plurality of global segments each of which includes a distinct non-contiguous subset of the sub-carriers spanning substantially the entire operating bandwidth. One or more of the global segments can be further partitioned into a plurality of local segments that each has a bandwidth that is less than a channel coherence bandwidth. The scheduler determines channel characteristics experienced by each communication device via reporting or channel estimation, and allocates one or more segments to communication links for each device according to the channel characteristics.

SUMMARY OF THE INVENTION

In view of the state of the art outlined in the foregoing, the Applicant has tackled the problem of scheduling transmissions in an OFDMA environment, and particularly in downlink transmissions, from a network base station to user terminals, like mobile stations.

The Applicant has found a peculiar structure for the downlink transmission sub-frame that can be advantageously exploited for implementing a power-aware opportunistic downlink scheduling method, satisfying the requirement of no QoS degradation and the goal of high throughput for best-effort traffic.

Exploiting such peculiar frame structure, the Applicant has devised a method of scheduling transmissions in a multi-carrier transmission system, comprising, for each downlink transmission frame:

partitioning the downlink transmission frame into a plurality of data regions each comprising an equal number of slots, each data region corresponding to a respective logical band;

for a currently active connection:
a) creating a first set of logical bands not fully occupied for transmission and having a minimum boosting level making the transmission receivable by a receiving terminal;
b) extracting from the first set a second set of logical bands available for allocating a maximum number of slots for downlink transmission to said active connection; and
c) selecting the logical band for downlink transmission to said active connection from the second set as the logical band that, after allocating the slots to the considered connection, leaves a residual number of slots equal to or smaller than a predetermined minimum residual in the logical band, e.g. the smallest residual number of slots.

The method may comprise:
assigning a credit to the active connection, said credit expressing an amount of slots that accumulated in preceding downlink transmission frames during which the active connection was not serviced; and
after selecting the logical band for downlink transmission to said active connection, updating the credit by adding a predetermined number of slots.

It may be assessed whether the updated credit is enough to fully occupy the selected logical band, and, in the affirmative case, transmission in downlink to said active connection is performed, otherwise the transmission is not performed.

After transmitting in downlink to said active connection, the credit may be updated by subtracting a number of slots used for downlink transmission to said active connection.

Said predetermined number of slots may be equal for every active connection.

Said predetermined number of slots may be a function of a perceived downlink transmission channel quality and of the number of slots per logical band.

A timer may be assigned to data which have to be transmitted to said active connection with priority; when the timer lapses, said data are transmitted before performing operations a), b) and c).

In case data already transmitted to the active connection have to be retransmitted, the data may be retransmitted before the data to be transmitted with priority.

According to another aspect of the present invention, a transmission scheduler is provided for scheduling transmissions in a multi-carrier transmission system, the transmission scheduler being operable to:
partitioning a current downlink transmission frame into a plurality of data regions each comprising an equal number of slots, each data region corresponding to a respective logical band;
for a currently active connection:
a) creating a first set of logical bands not fully occupied for transmission and having a minimum boosting level making the transmission receivable by a receiving terminal;
b) extracting from the first set a second set of logical bands available for allocating a maximum number of slots for downlink transmission to said active connection; and
c) selecting the logical band for downlink transmission to said active connection from the second set as the logical band that, after allocating the slots to the considered connection, leaves a number of slots equal to or smaller than a predetermined minimum residual in the logical band, e.g. the smallest residual number of slots.

According to still another aspect of the present invention, a base station of a multi-carrier transmission system is provided, comprising the above transmission scheduler.

According to a further aspect of the present invention, a multi-carrier transmission system is provided comprising the above base station.

BRIEF DESCRIPTION OF THE DRAWINGS

These and other features and advantages of the present invention will be better understood by reading the following description of some embodiments thereof, provided merely by way of non-limitative examples, to be read in conjunction with the attached drawings, wherein:

FIGS. 6, 7 and 8 shows an example of logical band selection according to an embodiment of the present invention.

DETAILED DESCRIPTION OF EMBODIMENTS OF THE INVENTION

Hereinafter, exemplary and non-limitative embodiments of the present invention will be presented and discussed in detail. Without loosing generality, reference will be made to a TDD (Time Division Duplexing) transmission system compliant to the IEEE 802.16 family of standards, which are incorporated herein by reference, but it is pointed out that the invention can be applied also to the transmission systems adopting an FDD (Frequency Division Duplexing) scheme, and also to other cellular and non-cellular systems based on OFDMA radio access (like LTE—Long Term Evolution—or Super3G), as well as to other multi-carrier transmission systems, i.e. transmission systems whose physical layer (the "PHY" layer of the ISO-OSI protocol layers stack) is based on multi-carrier transmission.

Figures 1, 2:
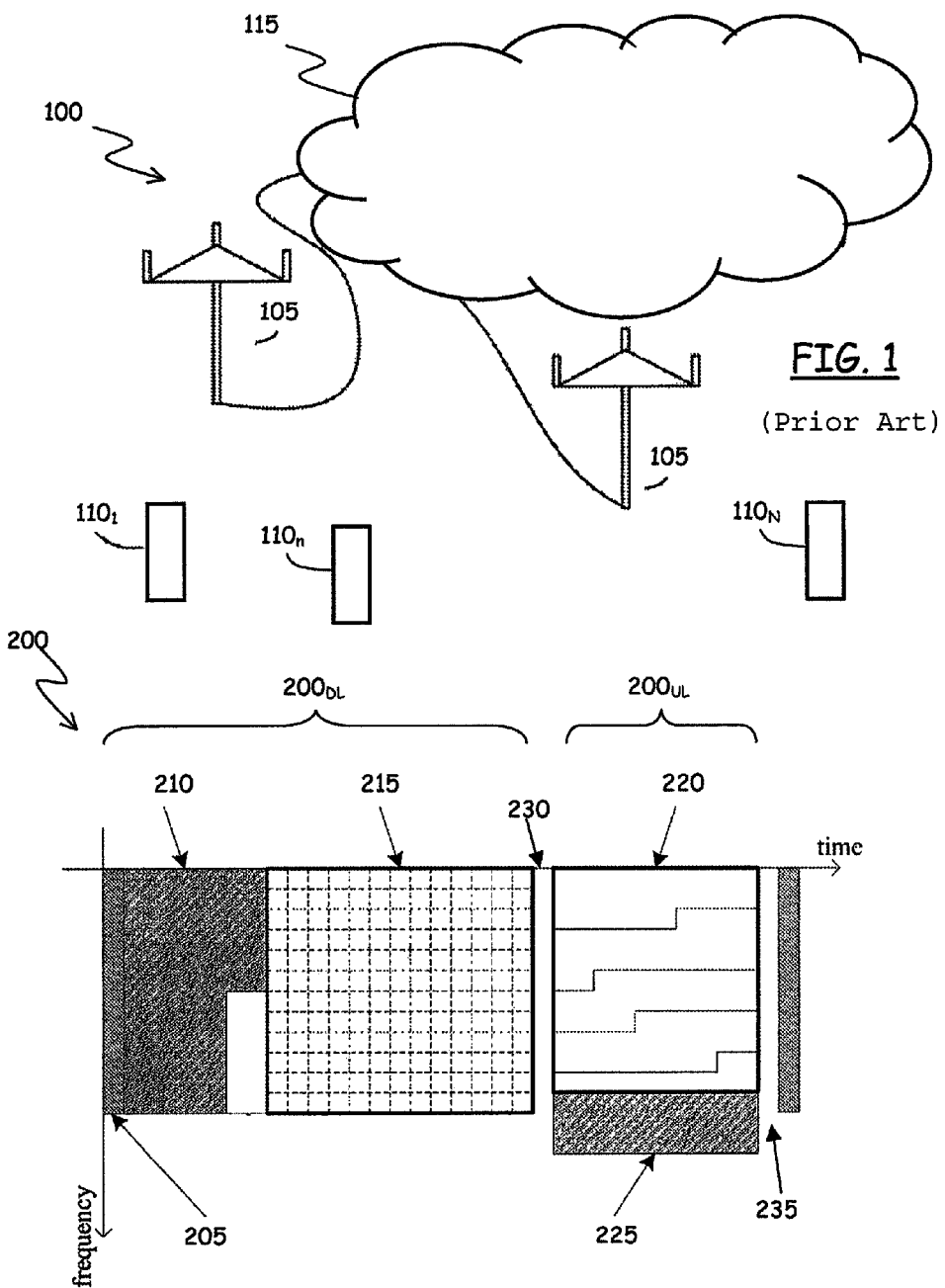
FIG. 1 is a pictorial representation of a communication network in which the present invention can be applied.
FIG. 2 depicting a structure of a frame according to an embodiment of the present invention.

FIG. 1 is a schematic, simplified pictorial representation of a communication network in which the present invention can be applied, particularly an IEEE 802.16 cellular network. The communication network, globally denoted 100, comprises a plurality of base stations 105, typically spread across a geographic area, each one covering a respective portion of the geographic area, referred to as a "cell", in order to serve users' mobile stations, like the mobile stations (MSs) $110_1, \ldots, 110_n, \ldots, 110_N$ (e.g., cellular phones), that happen to be located in the cells. The base stations 105 are connected to the core network 115, which in some network architectures may include base station controllers, controlling the base stations 105, and mobile switching centers, four routing calls.

The embodiments of the present invention described in the following are particularly concerned with the downlink transmission, i.e. the transmission from the network's base stations to the users' mobile stations.

As known to those skilled in the art, in the OFDM scheme a serial input stream is converted into parallel signals that are modulated using a plurality of orthogonal sub-carriers to transmit them.

As also known to those skilled in the art, the IEEE 802.16 standard has a connection-oriented MAC (Media Access Control) protocol, where every uni-directional connection can be uniquely identified in the cell and has its own set of QoS parameters. The transmission of variable-length packets is supported by means of a convergence layer, which can also perform header suppression functions. One or more MAC Service Data Units (SDUs) can then be encapsulated into a single MAC Protocol Data Unit (PDUs). For efficiency purposes, MAC SDUs can also be fragmented. For Hybrid Automatic Repeat Request (H-ARQ) enabled connections, MAC PDUs are then concatenated into an H-ARQ sub-burst (sub-burst, for short), which is appended a Cyclic Redundancy Check (CRC) trailer, is encoded and then transmitted over the air. The correct/incorrect decoding of an H-ARQ sub-burst is indicated by the recipient mobile station by means of a dedicated logical sub-channel in uplink. Failed sub-bursts can be re-transmitted by the base station up to a maximum number of times.

Each base station is responsible for sharing its available radio resources among the mobile stations associated to the serving cell on a short time scale, corresponding to a so-called "frame". As schematically shown in FIG. 2, depicting the peculiar structure of a frame according to an embodiment of the present invention, a frame 200 can be viewed as a bi-dimensional rectangle which extends over the time and frequency domains. In the time domain, the generic frame 200 consists of a number of time slots, the duration of each time slot corresponding to one OFDM symbol; in the frequency domain, the spectrum is divided into equally-spaced sub-carriers; sets of sub-carriers are logically combined into so-called "sub-channels". The minimum unit for transmission is referred to as a "slot", and consists of one or more time slots, in the time domain, and one sub-channel, in the frequency domain.

The generic frame 200 includes, in time sequence, a downlink sub-frame $200_{DL}$ and an uplink sub-frame $200_{UL}$. The downlink sub-frame $200_{DL}$ includes, in time sequence, a preamble portion 205, a downlink signaling portion 210, a downlink data portion 215; the uplink sub-frame $200^{UL}$ includes an uplink data portion 220 and an uplink signaling portion 225. The downlink sub-frame $200_{DL}$ is separated from the uplink sub-frame $200_{UL}$ by a Tx/Rx transition gap 230, while two frames (i.e., the uplink sub-frame $200_{UL}$ of a frame and the downlink sub-frame $200_{UL}$ of the next frame) are separated by an Rx/Tx transition gap 235.

Hereinafter, it will be assumed that distributed permutation of sub-carriers is used in downlink (i.e. the sub-carriers assigned to one mobile station are spread all over the downlink bandwidth), however this is not to be intended as a limitation of the present invention, that is applicable also to the case of adjacent sub-carriers; the specific allocation of sub-carriers for the generic mobile stations is not a limitation for the present invention.

Figure 3:
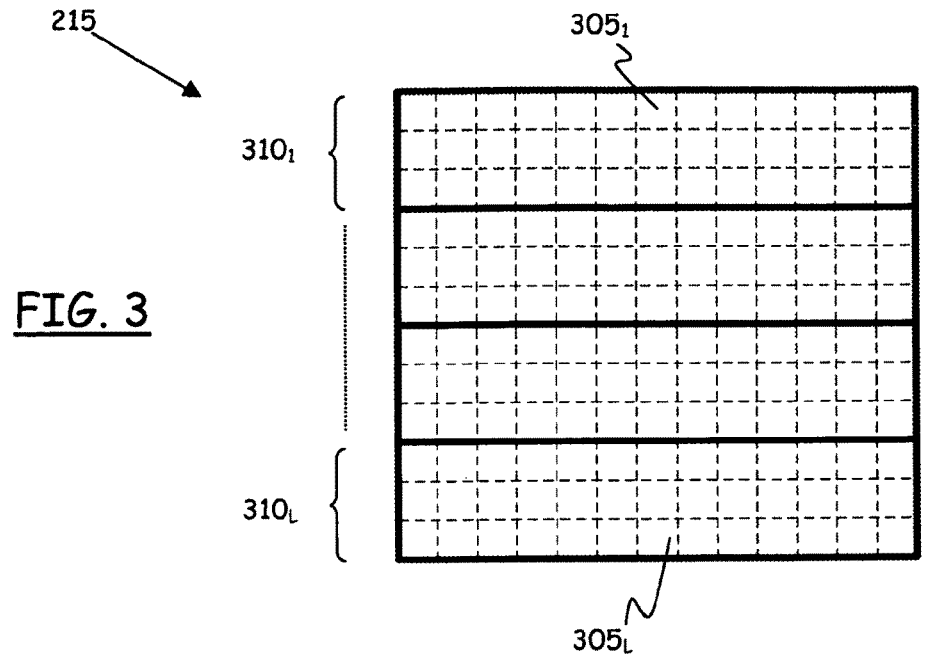
FIG. 3 shows a detail of the frame structure of FIG. 2, with data regions of equal shape and size, according to an embodiment of the present invention.

According to an embodiment of the present invention, the data portion 215 of the downlink sub-frame $200_{DL}$ is divided into a number L of different chunks $305_1$-$305_L$, also referred to as "data regions", as depicted in FIG. 3; the chunks, i.e. the data regions $305_1$-$305_L$ are rectangular in shape, and their sizes depends on the downlink sub-frame $200_{DL}$ duration, on the permutation scheme, and on the amount of downlink signaling (downlink signaling portion 210). A respective logical band $310_1$-$310_L$ corresponds to each data region $305_1$-$305_L$, the generic logical band being mapped to exactly one respective data region; the mapping of the logical bands $310_1$-$310_L$ to the data regions $305_1$-$305_L$ is advertised in a MAC (Media Access Control) control message called DL-MAP ("DownLink Map"), which is part of the downlink signaling portion 210 and is a broadcast message which defines the downlink access.

Each logical band $310_1$-$310_L$ can be transmitted by the base station with a different power level, also referred to as boosting level; the boosting level of the generic logical band $310_1$-$310_L$ can be set based on different factors, like for example inter-cell interference or QoS for the single connection. Algorithms are used to compute the boosting levels for the different logical bands $310_1$-$310_L$; a description of such algorithms is omitted because not considered relevant to the understanding of the invention embodiment here presented.

It is pointed out that, while in the IEEE 802.16e standard the data regions can have an arbitrary size and position within the frame, in the frame structure according to the herein described embodiment of the present invention and depicted in FIGS. 2 and 3, the shape of all the data regions is the same: the data region duration is equal to the number of time slots in the downlink data portion 215 of the frame (corresponding to the FUSC—Full-Usage Sub-Channelization zone of the frame), while the frequency span is equal to 1/L of the bandwidth, being L the number of logical bands.

Scheduling data regions of fixed size instead of data regions of arbitrary shape and position has several advantages, among which: (i) the allocation, i.e. the positioning of data regions, can be performed jointly with scheduling; (ii) since each logical band is reserved a set of logical sub-channels, data transmitted on a given logical band can be boosted while guaranteeing power stability over time; (iii) inter-cell coordination can be performed so that boosting in a given cell is not under-/over-compensated by the downlink power allocation of interfering cells.

Furthermore, mapping each logical band to one data region makes the process of estimating the worst-case size of the DL-MAP straightforward.

According to the IEEE 802.16e standard, each data region requires one Information Element (IE), whose size depends on the number of H-ARQ (Hybrid-Automatic Repeat Request) sub-bursts transmitted and the MCS (Modulation and Coding Scheme) used. In an embodiment of the present invention, the size of the logical bands $310_1$-$310_L$ is selected so that one H-ARQ sub-burst of target size can be transmitted at the lowest MCS. Therefore, the minimum size of the DL-MAP is derived as that resulting from L data regions with a single H-ARQ sub-burst each. While the maximum size of the DL-MAP can be much larger than that, it is expected to be very unlikely that the best possible situation when all the MSs receive data with the most efficient MCS will ever occur in a real network. Therefore, according to an embodiment of the present invention, the DL-MAP size is selected based on the average DL-MAP as obtained from simulations under different network and load configurations, possibly enlarged by a tolerance factor, e.g. equal to 1.2.

Let it be assumed that a number of OFDM symbols are withdrawn from the downlink sub-frame, based on the nominal size of the DL-MAP and UL-MAP and on the MCS that is employed for broadcasting them. After scheduling of user data has been performed, there can be unallocated OFDM symbols in the portion of the downlink sub-frame reserved for the DL-MAP and UL-MAP. This capacity can be employed by the base station for transmitting broadcast non-periodic MAC control messages that are not subject to regular scheduling.

A scheduling method according to an embodiment of the present invention will be described hereinafter. The scheduling method is in particular implemented by means of a scheduling algorithm and is performed by the generic base station.

Let S be the number of slots for each of the L logical bands $310_1$-$310_L$; the total number of slots per frame is thus equal to S×L. For instance, if the profiles from the WiMAX Forum for Mobile BWA for 10 MHz band are used and the total number of OFDM symbols per downlink sub-frame is 35, and full reuse with 30 sub-channels is employed, the number L of logical bands may be 15, and 6 OFDM symbols may be reserved for the MAC control messages plus synchronization preamble, so that the number S of slots may be 28.

For the sake of description simplicity, let it be assumed that each mobile station has only one connection established, either real-time or best-effort. Real-time connections convey traffic from applications that require a minimum rate to operate correctly; examples of such applications are digitized voice and video streaming. Best-effort connections do not have this requirement. The algorithm described herebelow can be extended to the case of multiple connections per mobile station in a straightforward manner. At a given scheduling time, let N be the number of mobile stations with an active connection. A connection is said to be active if there are data waiting to be transmitted buffered at the sending station. Hereinafter, active mobile stations are considered those having an active connection. Also, still for the sake of description simplicity, it will be first assumed that there is not real-time traffic, then the modifications that are needed to fulfill the QoS requirements of real-time connections will be described.

Figure 4:
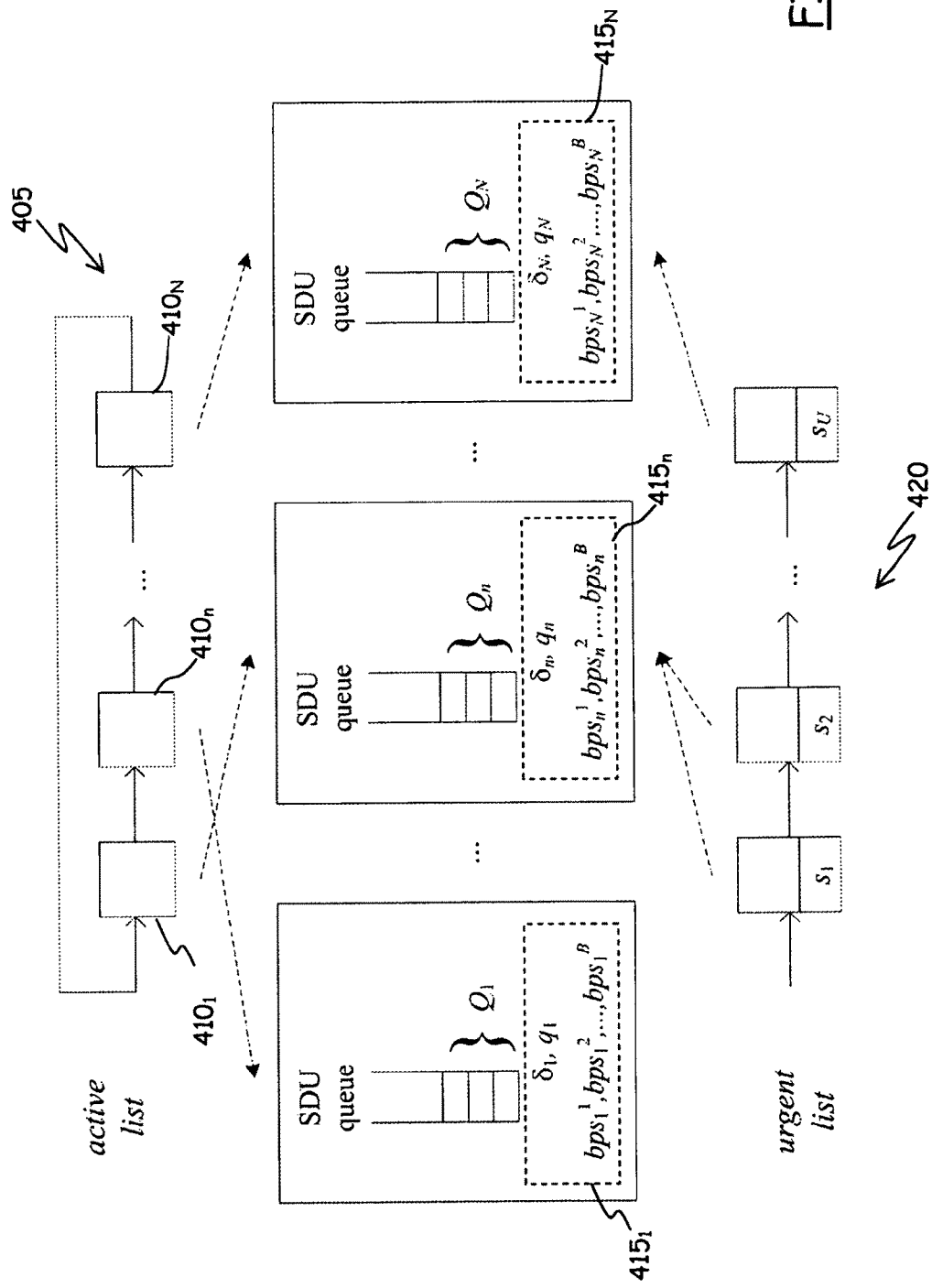
FIG. 4 shows data structures used by a scheduling algorithm according to an embodiment of the present invention.

The data structures used by the scheduling algorithm are illustrated in FIG. 4.

An active list 405 is kept which contains identifiers of the active connections; in the example here considered, since as mentioned it is assumed that each mobile station may have one connection only active, the active list 405 corresponds to a list of active mobile stations. The active list 405 is structured as explained below.

All MAC SDUs received from upper layers in the ISO OSI stack are enqueued as regular data into respective per-connection queues $Q_1, \ldots, Q_n, \ldots, Q_N$; thus, for each connection, i.e., under the current assumption of one connection possible for any mobile station, for each mobile station $110_1, \ldots, 110_n, \ldots, 110_N$ there is a respective queue $Q_1, \ldots, Q_n, \ldots, Q_N$ of SDUs waiting to be transmitted.

As it will be described below in details, not all active mobile stations are eligible at any time during scheduling. Mobile stations not eligible are said ineligible, and they are not provided by the scheduler with any resource in the current frame. The generic mobile station $110_n$ is assigned two status variables:

$\delta_n$: credit assigned to the mobile station $110_n$, expressed in terms of slots, that accumulated over the last rounds while the mobile station $110_n$ was not eligible for scheduling; the credit δn is set equal to 0 while a mobile station $110_n$ is not active.

$q_n$: quantum of the mobile station $110_n$, expressed in terms of slots, which is the number of slots that the generic active mobile station $110_n$ is granted whenever it is selected for scheduling. In the following it is assumed that the quanta are equal for all the mobile stations, and are set equal to S; however, different policies can be devised to enable service differentiation or tuning the scheduler's opportunism, as described later.

Finally, it is assumed that an Adaptive Modulation and Coding (AMC) procedure is implemented by the base station, which is able to determine, for each boosting level b in the B boosting levels, the MCS to be used to transmit data to the generic mobile station $110_n$, hence the number of bytes that can be conveyed per slot is: $bps_b^n$, $n\in[1,N]$ and $b\in[1,B]$. If the mobile station $110_n$ cannot receive at all with boosting level b, or if the expected error rate would exceed a given threshold, then $bps_b^n=0$. Additionally, it is possible for the network operator to define a subset of MCSs that, though defined by the IEEE 802.16e standard, are not to be used for downlink data transmission. For instance, one may think of not using the MCSs with repetition code greater than 1, which have very poor efficiency with respect to the others, and rely on transmitting to the mobile stations with degrade channel quality into boosted logical bands only.

The following variables are used for performing the overall scheduling function:

$a_l$, $l\in[1,L]$, which is the number of slots that are available for transmission in the generic logical band l, hereinafter called residual. These values are reset to S at the beginning of each frame;

$a^{min}$, which is a system parameter that defines when a logical band is considered to be "full", as explained below. This parameter is used to determine the terminating condition of the scheduling algorithm. The impact on the performance of $a^{min}$ may be evaluated via simulation.

$b_l$, $l\in[1,L]$, which is the boosting level to be used to transmit data in the logical band l. These values are the inputs of the present algorithm and, as mentioned in the foregoing, can be generated by an external algorithm not considered here because not relevant for the understanding of the present invention embodiment.

Figure 5:
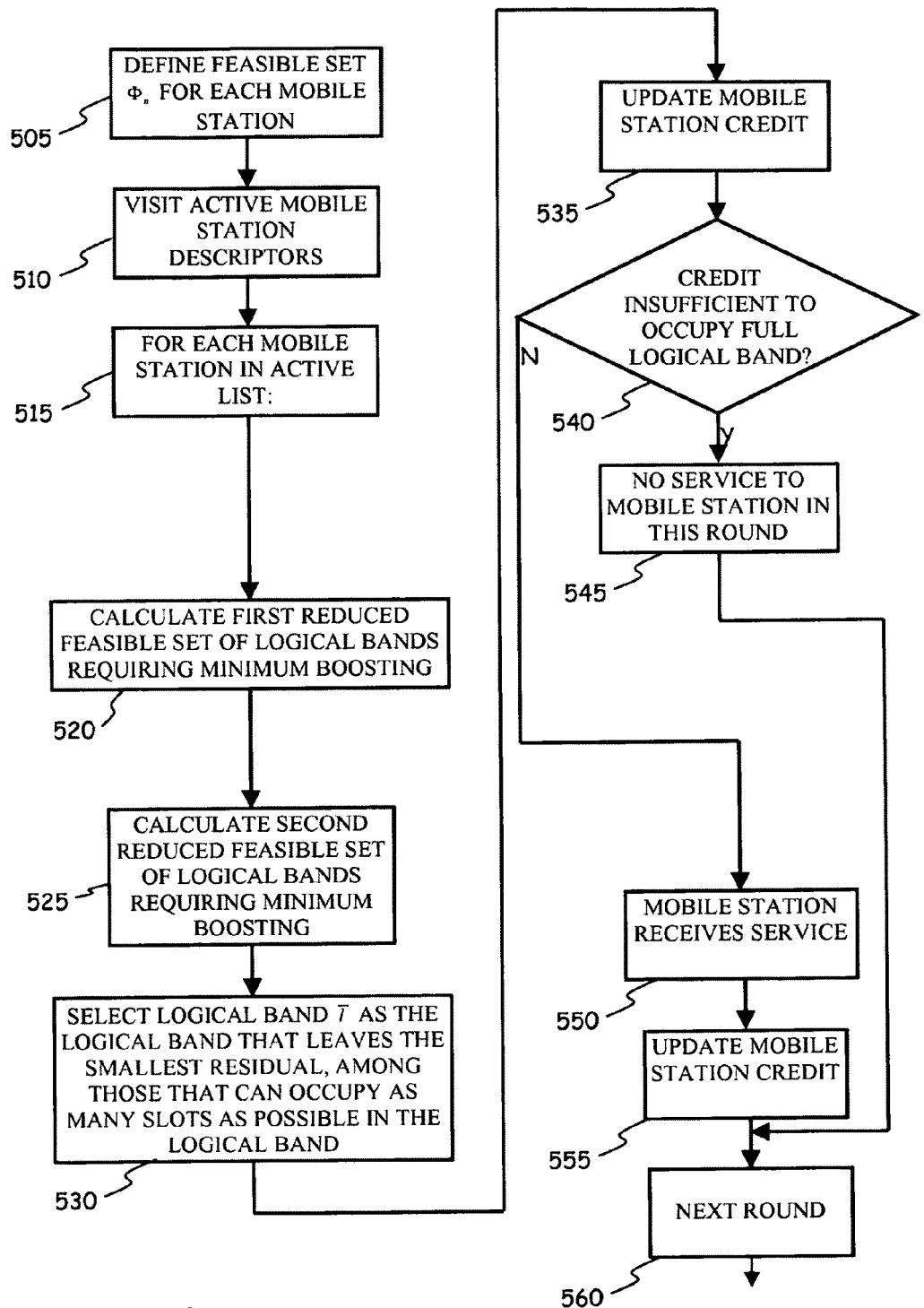
FIG. 5 is a schematic flowchart of a phase of the scheduling algorithm according to an embodiment of the present invention.

The scheduling algorithm comprises a phase encompassing a selection of the logical band for transmitting data. The logical band selection is described hereinafter, with the aid of the schematic flowchart of FIG. 5.

At the base station, the status and queue of each mobile station are logically stored in mobile station descriptors $415_1, \ldots, 415_n, \ldots, 415_N$. The base station visits the mobile station descriptors in, e.g., round-robin order, based on the time when the mobile stations became active. The active list 405 is the list of the pointers $410_1, \ldots, 410_n, \ldots, 410_N$ to the mobile station descriptors $415_1, \ldots, 415_n, \ldots, 415_N$. A new element is added to the tail of the active list 405 when an idle mobile station becomes active. An element is removed from the active list 405 when the pointed mobile station does not have any more enqueued SDUs to receive.

For each mobile station, like the generic mobile station $110_n$, a "feasible set" $\Phi_n$ is defined (block 505) as the set of logical bands $310_1, \ldots, 310_L$ that the mobile station $110_n$ can actually exploit for receiving data (i.e. having a boosting level b at which the mobile station $110_n$ can receive data, i.e. $bps_{b_l}^n>0$) and that have a number of slots available for transmission greater than $a^{min}$, i.e.:

$$\Phi_n = \{l | bps_{b_l}^n > 0 \char`\^ a_l > a^{min}\}.$$

After initialization, the scheduling algorithm visits each mobile station descriptor $415_1, \ldots, 415_n, \ldots, 415_N$ (block 510) by cycling through the active list 405 in a circular manner, until one of the following conditions becomes true:

N=0, i.e. the active list 405 becomes empty; or $\forall n \in [1,N]: \Phi_n = \emptyset$, i.e. all the bands are "full" as defined by $a^{min}$.

At each visit of the descriptor $415_n$ of the mobile station $110_n$, the scheduling algorithm first selects the logical band to be used for transmission to the mobile station $110_n$. The number of slots $s_l$ that can be scheduled for transmission to the mobile station $110_n$ in the logical band l are:

$$s_l = \min\{a_l, \sigma(Q_n, bps_{b_l}^n, a_l)\},$$

where $\sigma(Q_n, bps_{b_l}^n, a_l)$ is the number of slots that can be actually used by the mobile station $110_n$ if it is served in the logical band l, depending on the backlogged SDUs, the MCS and the residual. Any MAC overhead, including packing/fragmentation and H-ARQ correction codes, is taken into account by the function $\sigma(\cdot)$.

For each mobile station in the active list 405 (block 515), let a first reduced feasible set $\Phi_n'$ of the mobile station $110_n$ be calculated as follows (block 520):

$$\Phi_n' = \left\{ l \in \Phi_n \mid b_l = \min_{k \in \Phi_n} \{b_k\} \right\}$$

The first reduced feasible set $\Phi_n'$ includes all the logical bands that require minimum boosting. The first reduced feasible set $\Phi_n'$ is further reduced to a second reduced feasible set $\Phi_n''$ (block 525), defined as follows:

$$\Phi_n'' = \left\{ l \in \Phi_n' \mid s_l = \max_{k \in \Phi_n'} \{s_k\} \right\}.$$

The second reduced feasible set $\Phi_n''$ only includes the logical bands of first reduced feasible set $\Phi_n'$ for which the base station can transmit the maximum amount of data to the mobile station $110_n$.

The logical band $\bar{l}$ actually used for transmission is selected in the first reduced feasible set $\Phi_n'$ as (block 530):

$$\bar{l} = \underset{l \in \Phi_n''}{\arg\min} \{a_l - \sigma(Q_n, bps_{b_l}^n, a_l)\}.$$

In other words, $\bar{l}$ is the logical band that leaves the smallest residual, among those that can occupy as many slots as possible in the logical band. More generally, the logical band $\bar{l}$ actually used for transmission may be selected in the first reduced feasible set $\Phi_n'$ as the logical band that leaves a residual equal to or smaller than a predetermined residual value.

At this point, the mobile station credit is updated as follows (block 535):

$$\delta_n \leftarrow \delta_n + q_n.$$

The credit $\delta_n$ of the mobile station is then assessed (block 540). If the credit $\delta_n$ is not enough to fully occupy the selected logical band $\bar{l}$, i.e. if $\delta_n < s_{\bar{l}}$ (block 540, exit branch N) then the mobile station does not receive any service in this round (block 545). This is also the case if the reduced feasible sets $\Phi_n'$ and $\Phi_n''$ of the mobile station $110_n$ were empty. In case the credit $\delta_n$ is enough to fully occupy the selected logical band $\bar{l}$, i.e. if $\delta_n \geq s_{\bar{l}}$ (block 540, exit branch N), then the mobile station receives service (block 550) and its credit is updated as follows (block 555):

$$\delta_n \rightarrow \delta_n + a_{\bar{l}} - \sigma(Q_n, bps_{b_{\bar{l}}}^n, a_{\bar{l}})$$

The mobile station descriptor is then visited in the next round (block 560).

Hereinafter, the method for selecting the logical band described above will be presented by making reference to a practical example.

Let it be assumed that, in the round-robin visit order, the descriptor $415_n$ of the mobile station $110_n$ is visited. The current resource status is depicted in FIG. 6; there are 8 logical bands (L=8), some of which have been already partially or totally occupied during the previous scheduling rounds.

Let it be assumed that the mobile station $110_n$ requires at least a boosting level of 3 dB, hence the logical bands l=2, 5, 6, and 8 cannot be exploited for transmission to this mobile station, and they are thus not included in the feasible set $\Phi_n$. Additionally, since there are three logical bands, namely l=1, 4, and 7, with a 3 dB boosting level, the logical band l=3 is not included in the first reduced feasible set $\Phi_n'$, because of the first condition of the definition of $\Phi_n'$. The second condition to derive the first reduced feasible set $\Phi_n'$ depends on the SDUs backlogged on the mobile station $110_n$. Four cases are considered, which are illustrated in the table at the right of FIG. 7. If there are 5 or 6 slots of backlogged data directed to the mobile station $110_n$, then the only logical band that is included in the first reduced feasible set $\Phi_n'$ is logical band l=4. In the figure, the maximum values, for each $\sigma$, are marked in bold, and are: 1 for $\sigma$=1, 3 for $\sigma$=3, 5 for $\sigma$=5 and 6 for $\sigma$=6. On the other hand, if the amount of backlogged data is, respectively, 1 slot or 3 slots, then the first reduced feasible set $\Phi_n'$ includes all the logical bands or the logical bands l=1 and l=4, respectively. In these cases, the tie is broken based on the residual that would result for each logical band if it were selected for data transmission, as depicted in FIG. 8.

The final logical band $\bar{l}$ selected for the mobile station $110_n$ is then $\bar{l}$=1, only if it has only 3 slots of backlogged data. Otherwise, if the mobile station $110_n$ has only 1 slot of backlogged data, the selected logical band is $\bar{l}$=7.

In any case, after having updated it, the credit $\delta_n$ of the mobile station $110_n$ is compared to the number of slots to be transmitted in the selected logical band $\bar{l}$. Transmission actually takes place only in case the mobile station has accumulated enough credit, otherwise it is skipped.

The quanta may be set statically to be equal to the same number of slots, in order to provide wireless fairness among users, which are given a fair share of the wireless resources, i.e. slots, while their mobile stations are active. Since users can experience (very) different channel conditions, receiving the same amount of slots does not necessarily lead to throughput fairness during short periods. In fact, users with more efficient MCSs will be able to receive a greater amount of bytes in the unit of time compared to users with less efficient MCSs. The Applicant believes this behavior to be correct, since challenged users should not penalize the overall system performance by being granted large shares to overcome their bad channel conditions. This is especially true if the channel is likely to change over a wide range of conditions, which would also lead to throughput fairness over large periods.

However, if the desired behavior is that of providing short-term throughput fairness, this can still be achieved as follows with the proposed scheduling algorithm.

At the beginning of each frame, before performing the scheduling procedure, the base station sets the quantum $q_n$ of the mobile station $110_n$ so that it is inversely proportional to, e.g., the number of bytes per slot in the logical band with no boosting: $q_n = S/bps_1^n$. In this way, the more efficient is the MCS employed for transmitting data to a mobile station, the smaller becomes the number of slots that the mobile station is granted at each visit.

In general, the quanta can be set according to any function of the perceived channel quality and the number of slots per logical band and other parameters:

$$q_n = f(S, \{bps_b^n, b \in [1,B]\}, \ldots)$$

It is pointed out that even though best-effort connections were so far considered, service differentiation among mobile stations can be achieved by appropriately tuning the quanta. For instance, if weighted fairness is to be provided, then the quantum $q_n$ of the mobile station 110$_n$ can be set equal to $q_0 \cdot \phi_n$, where $q_0$ is a reference quantum and $\phi_n$ is the weight assigned to the mobile station 110$_n$. In this way, during any time interval while two mobile stations i and j are continuously active, the ratio between the number of slots granted thereto will be equal to $\phi_i/\phi_j$.

When H-ARQ sub-bursts fail to be received by the recipient mobile station, a negative acknowledgment is received by the base station, which has to retransmit the H-ARQ sub-burst with the same MCS, until the maximum number of H-ARQ retransmissions is exceeded. Since a mobile station has to cumulate enough credit before it is entitled to transmit a H-ARQ sub-burst, in a preferred embodiment of the present invention it is considered not fair to treat H-ARQ retransmissions as if it were SDUs that have never been transmitted. Furthermore, scheduling new SDUs of a mobile station before its H-ARQ retransmissions can lead to the saturation of the stop-and-wait slots of the mobile station. Therefore, in a preferred embodiment of the invention H-ARQ retransmissions are scheduled to take place before running the scheduling algorithm described in the foregoing, which instead only applies to "regular" enqueued SDUs. This may for example be achieved by promoting the H-ARQ sub-burst that are to be retransmitted inserting them into per-mobile station H-ARQ buffers, as prescribed by the IEEE 802.16 standard. Since it is likely that only a small portion of the transmitted H-ARQ sub-bursts fail to be received, it is believed unnecessary to devise a policy to decide in which order they have to be scheduled for retransmission, since all of them will fit into the logical bands. Instead, two strategies can be used to select which boosting level to use:

- retransmitting each H-ARQ sub-burst into a logical band with the same boosting level used for its first transmission, if possible; or
- retransmitting the H-ARQ sub-burst into a logical band with boosting level 0, if possible.

The relative impact on the performance of the two strategies above can be evaluated via simulation.

In the foregoing, best-effort connections have been considered. A possible solution to deal with real-time connections is to serve them with intermediate priority between the H-ARQ retransmissions and regular scheduling of queued SDUs. Since admission control is to be performed before real-time connections are established, it is likely that there would be enough resources to serve them completely in most frames without the need of more sophisticated scheduling algorithms.

However, nothing prevent from exploiting opportunistic scheduling also for real-time connections, as described hereinafter.

It is assumed that the QoS requirements of the generic mobile station 110$_n$ can be translated into the following parameters:

$c_n$: nominal SDU size, in bytes;
$T_n$: urgency time, in seconds.

The aim is at providing each mobile station with a bit-rate that is greater than or equal to $C_n/T_n$ bytes/s. To achieve this, an urgent list 4210 is kept at the base station, as depicted in FIG. 4, which, in an embodiment of the present invention, is implemented as a FIFO (First-In, First-Out) list.

Whenever an SDU is enqueued at a real-time mobile station (i.e., a mobile station having a real-time connection), a timer is started that expires after $T_n$ seconds. Scheduling is performed according to the procedure described above with no special treatment of the mobile station until the timer expires. When this happens, an element is added to the tail of the urgent list 4210, which specifies the identifier of the real-time connection and the nominal SDU size $C_n$. The urgent list 420 is then served before regular scheduling, i.e. immediately after H-ARQ retransmissions are scheduled for transmission. The amount of service for each connection in the urgent list 420 is preferably limited to $C_n$ bytes. The logical band is selected via the usual rules for best-effort scheduling, while the credit is not modified in the process.

Figure 9:
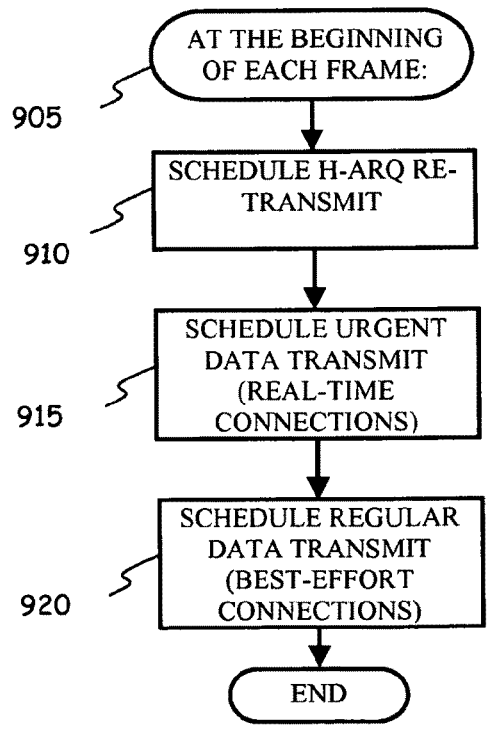
FIG. 9 is a schematic flowchart reassuming a scheduling method according to an embodiment of the present invention.

As reassumed in FIG. 9, the scheduling method according to the herein presented embodiment of the present invention starts at the beginning of every frame (block 905), and comprises three phases. H-ARQ sub-bursts waiting to be retransmitted are scheduled first, and the H-ARQ retransmissions are served in a FIFO order (block 910). Then, any pending urgent data from real-time connections are scheduled (block 915); the connections with urgent data are served in the same order in which their timer expired. Finally, regular data are served (block 920). If the frame becomes exhausted in any of these three phases, the scheduling terminates immediately.

A typical application scenario for the present invention are beyond-3G cellular systems, so in the following we shall often refer to this kind of system. However the invention is also applicable to different categories of communication systems, including non-cellular networks.

The present invention has been here described in connection with some embodiments thereof. Several changes to the described embodiments and other embodiments of the invention are possible, without departing from the protection scope defined in the appended claims.

The invention claimed is:

1. A method of scheduling transmissions in a multi-carrier transmission system, comprising, for each downlink transmission frame:
   partitioning the downlink transmission frame into a plurality of data regions each comprising an equal number of slots, each data region corresponding to a respective logical band, each logical band being a contiguous collection of subcarriers;
   for a currently active connection:
   a) creating a first set of logical bands not fully occupied for transmission and having a minimum boosting level making the transmission receivable by a receiving terminal;
   b) extracting from the first set a second set of logical bands available for allocating a maximum number of slots for downlink transmission to said active connection; and
   c) selecting a logical band for downlink transmission to said active connection from the second set as the logical band that, after allocating the slots to a considered connection, leaves a residual number of slots equal to or smaller than a predetermined minimum residual in the logical band;
   assigning a credit to the active connection, said credit expressing an amount of slots that accumulated in preceding downlink transmission frames during which the active connection was not serviced; and after selecting the logical band for downlink transmission to said active connection, updating the credit by adding a predetermined number of slots.

2. The method of claim 1, comprising:

assessing whether the updated credit is enough to fully occupy the selected logical band, and, in the affirmative case, transmitting in downlink to said active connection, otherwise not transmitting.

3. The method of claim 2, comprising:

after transmitting in downlink to said active connection, updating the credit by subtracting a number of slots used for downlink transmission to said active connection.

4. The method of claim 1, wherein said predetermined number of slots is equal for every active connection.

5. The method of claim 1, wherein said predetermined number of slots is a function of a perceived downlink transmission channel quality and of a number of slots per logical band.

6. A method of scheduling transmissions in a multi-carrier transmission system, comprising, for each downlink transmission frame:

partitioning the downlink transmission frame into a plurality of data regions each comprising an equal number of slots, each data region corresponding to a respective logical band, each logical band being a contiguous collection of subcarriers;

for a currently active connection:
  a) creating a first set of logical bands not fully occupied for transmission and having a minimum boosting level making the transmission receivable by a receiving terminal;
  b) extracting from the first set a second set of logical bands available for allocating a maximum number of slots for downlink transmission to said active connection; and
  c) selecting the logical band for downlink transmission to said active connection from the second set as the logical band that, after allocating the slots to the considered connection, leaves a residual number of slots equal to or smaller than a predetermined minimum residual in the logical band;

assigning a timer to data which have to be transmitted to said active connection with priority; and when the timer lapses, transmitting said data before performing operations a), b) and c).

7. The method of claim 6, comprising:

in case data already transmitted to the active connection have to be retransmitted, retransmitting the data already transmitted before the data to be transmitted with priority.

8. A transmission scheduler for scheduling transmissions in a multi-carrier transmission system, comprising a transmission scheduler capable of:

partitioning a current downlink transmission frame into a plurality of data regions, each comprising an equal number of slots, each data region corresponding to a respective logical band, each logical band being a contiguous collection of subcarriers;

for a currently active connection:
  a) creating a first set of logical bands not fully occupied for transmission and having a minimum boosting level making the transmission receivable by a receiving terminal;
  b) extracting from the first set a second set of logical bands available for allocating a maximum number of slots for downlink transmission to said active connection; and
  c) selecting a logical band for downlink transmission to said active connection from the second set as the logical band that, after allocating the slots to the considered connection, leaves a residual number of slots equal to or smaller than a predetermined minimum residual in the logical band;

assigning a credit to the active connection, said credit expressing an amount of slots that accumulated in preceding downlink transmission frames during which the active connection was not serviced; and after selecting the logical band for downlink transmission to said active connection, updating the credit by adding a predetermined number of slots.

9. A base station of a multi-carrier transmission system, comprising a transmission scheduler according to claim 8.

10. A multi-carrier transmission system comprising a base station according to claim 9.

11. A transmission scheduler for scheduling transmissions in a multi-carrier transmission system, comprising a transmission scheduler capable of:

partitioning a current downlink transmission frame into a plurality of data regions, each comprising an equal number of slots, each data region corresponding to a respective logical band, each logical band being a contiguous collection of subcarriers;

for a currently active connection:
  a) creating a first set of logical bands not fully occupied for transmission and having a minimum boosting level making the transmission receivable by a receiving terminal;
  b) extracting from the first set a second set of logical bands available for allocating a maximum number of slots for downlink transmission to said active connection; and
  c) selecting a logical band for downlink transmission to said active connection from the second set as the logical band that, after allocating the slots to the considered connection, leaves a residual number of slots equal to or smaller than a predetermined minimum residual in the logical band;

assigning a timer to data which have to be transmitted to said active connection with priority; and when the timer lapses, transmitting said data before performing operations a), b) and c).

* * * * *